United States Patent
Paduano

(10) Patent No.: US 6,619,874 B2
(45) Date of Patent: Sep. 16, 2003

(54) ANGULAR MOVEMENT RESTRICTION BUSHING FOR BALL JOINT

(75) Inventor: Enzo Paduano, Sao Bernardo Do Campo (BR)

(73) Assignee: Dana Industrial S/A, Sao Paulo (BR)

(*) Notice: Subject to any disclaimer, the term of this patent is extended or adjusted under 35 U.S.C. 154(b) by 0 days.

(21) Appl. No.: 10/020,242

(22) Filed: Dec. 18, 2001

(65) Prior Publication Data

US 2002/0076268 A1 Jun. 20, 2002

(30) Foreign Application Priority Data

Dec. 18, 2000 (BR) .............................. 0006510

(51) Int. Cl.$^7$ ................................ F16C 11/00
(52) U.S. Cl. ..................... 403/137; 403/134
(58) Field of Search ................. 403/122, 135, 403/136, 137, 134

(56) References Cited

U.S. PATENT DOCUMENTS 2,178,206 A * 10/1939 Katcher ................ 403/135 X
4,527,924 A * 7/1985 Asberg ................... 403/138 X
5,772,352 A * 6/1998 Fukumoto et al. ...... 403/136 X

* cited by examiner

Primary Examiner—Lynne H. Browne
Assistant Examiner—John R. Cottingham
(74) Attorney, Agent, or Firm—Liniak, Berenato & White

(57) ABSTRACT

A angular movement restriction bushing for ball joints, made of elastomeric providing two quadrants of its external surface with recesses and another two quadrants with smooth external surfaces, opposite between themselves, wherein one of the faces of the bushing is provided with an involving washer that prevents its deformation when mounted and in operation. For correct assembly and improved operation, there is provided a positioning hole, that may be constructed in several forms, but that, encased and in projection of the oblong opening of the ball joint box, has the important function of positioning the bushing when mounting of the ball joint so that the smooth surface of its external circumference, provided in it, stays coincident with the oblong opening existent in the end of the ball joint box. With the construction object of this invention, the bushing has the function of spring and the recesses provided in the opposite quadrants of the external circumference of the bushing have the function of an accordion, while providing the required sealing of the system.

5 Claims, 1 Drawing Sheet

ANGULAR MOVEMENT RESTRICTION BUSHING FOR BALL JOINT

BACKGROUND OF THE INVENTION

1. Field of the Invention

This invention refers to a angular movement restriction bushing for ball joint, for application in connections which require angular and rotational movement of two pieces, wherein however the angular movement needs to be restricted in a certain direction, in order to obtain the desired technical effect and, more particularly, this invention deals with a bushing for ball joint to be applied in automotive vehicles.

2. Description of Related Art

The usual technique for the construction of the ball joints is based on a construction composed of a box or receptacle where is housed a single bearing or split bearing that, by its turn, houses a ball that is disposed as an integral part of the end of a pin, the so-called ball pin. This assembly, duly mounted, has a fixing system at the external part of the box or receptacle, the same occurring at the end opposite to the ball, of the so-called ball pin, in such a way that, once the box is fixed in a mobile piece and the body of the ball pin in another one, provides to both pieces, angular and rotational movements. These are the usual constructions of ball joints, generally employed in the steering and suspension systems of a vehicle, but, depending on the place where they are to be applied, the same, individually, have specificities, which aim to attend the operating requirements demanded of the pieces that must be connected and pivoted.

In the scope of this invention, the ball joint with the angular movement restriction bushing needs to allow the free rotational movement of the ball pin but, at the same time, to restrict the angular movement of this same ball pin in certain direction, as it is applied, preferably, in steering or connecting rods in which it is undesirable the movement of rotation relative to the longitudinal axles contained in the same. The rotational movement of the rod relative to its longitudinal axle forces the ball pin to displace angularly toward one of the sides of the ball joint box, causing the inadequate operation of the ball joint itself and further of the rod itself, that has been designed to operate aligned to the other components of the system. To overcome these deficiencies, the state of the art preceding this invention has employed until now as an alternative, to position the oblong opening of the ball joint box, that is common in this type of construction, through which is projected the body of the ball pin, in such a way that the narrowest side of the opening, that is, the side that allows shorter angularity in the movement of the ball pin, is coincident with the plan where it is desired to restrict the movement of the ball pin, and this prevents the bar from rotating around its longitudinal axle. This technique, as it is obvious to infer, does not solve the problem, as this prevents the rod from rotating around its longitudinal axle, and this only occurs because the body of the ball pin of the ball joint has displaced to its maximum limit of angularity to that side and abuts the oblong opening of the ball joint box. Thus, while this partially solves the problem of rotation of the rod, another problem is caused, namely the inadequate operation of the ball joint, with its ball pin working leaned against the opening of the box, therefore outside of its geometrical axle, as it has been designed.

This inadequate operation of the ball joint will cause deficiency of movement, premature wearing out, noises and other undesirable inconveniences. Aiming to solve these inconveniences of inadequate operation of the ball joint, the state of art, also precedent to this invention, developed some systems that consisted in replacing the protection cover of the ball joint by a kind of rubber bushing which, when the assembling of the ball joint on the rod is carried out, the same is compressed causing a spring like effect, which in cooperation with the narrowest part of the oblong opening of the ball joint box, has as purpose to avoid the rotation, preventing the same from displacing itself around its longitudinal axle, at the same time that it holds, when the strain is not great, the ball pin of the ball joint in the geometrical axle in which it was designed. However, until now, also this technique has not presented the effects that are desirable, as, when one substitutes the protection cover by the rubber bushing, this latter must be constructed in such a way as to provide to the ball joint the same sealing effect provided by the protection cover. In order to attain this objective, the prior art technique required additional processes of machining in the ball joint and a special construction system for the rubber bushing in order to make possible that the same performs the two functions, namely, that of sealing the opening of the ball joint and that of providing the spring like effect so that the ball pin of the ball joint be maintained in its designed geometrical axle. This system, besides making the end product more expensive, has a low index of applicability, as its use is limited to rods with few movements and, consequently, they do not produce a great strain upon the ball pin. Further, in function of the constant strain upon the rubber bushing, this latter tends to deteriorate prematurely the working lifetime of the ball joint, what will affect the sealing system and, as a consequence, with this negative action, the ball joint will be contaminated by impurities such as dust, sand and water, causing its premature wearing out.

Apart from the above-described technique, there are other systems developed with the same objective of restricting the angular movement of the ball joint in a certain direction but, as they are systems utilized in rods with a wide range of displacements, namely, of generic applicability, irrespective of the movement of the bar, they are complex and high cost systems, as they require the construction of an extension in the ball section of the ball pin and, in complement, the construction of a special cover for the ball joint box, through which is projected the body of the ball pin. These system function to house the extension of the ball section of the ball pin, to, in cooperation with the oblong opening of the box, restrict the angular movement of the ball pin in a certain direction. These systems are efficient, but, rather expensive, as it can be deducted from the above description and, when the ball joint is intended for rods with few movement, the high cost of these systems economically render unfeasible its use for this specific and limited utilization.

SUMMARY OF THE INVENTION

Thus, in the scope of this invention, a bushing that restricts the angular movement for ball joint thus suppressing the deficiencies existent in the state of the art, with low cost, high durability and, mainly, with an efficient sealing system that, concomitantly substitutes the protecting cover of the ball joint, restricts its angular movement in a certain direction, produces the spring like effect maintaining the ball pin always in its designed geometrical axle, and has high durability, as it does not submit the material of the bushing, constructed of elastomer, to excessive strains.

BRIEF DESCRIPTION OF THE DRAWINGS

Next, it is herein detailed this invention, presenting the description of a preferred embodiment of the invention that is shown in the attached drawings, in which.

DETAILED DESCRIPTION OF THE PREFERRED EMBODIMENT

Figure 1:
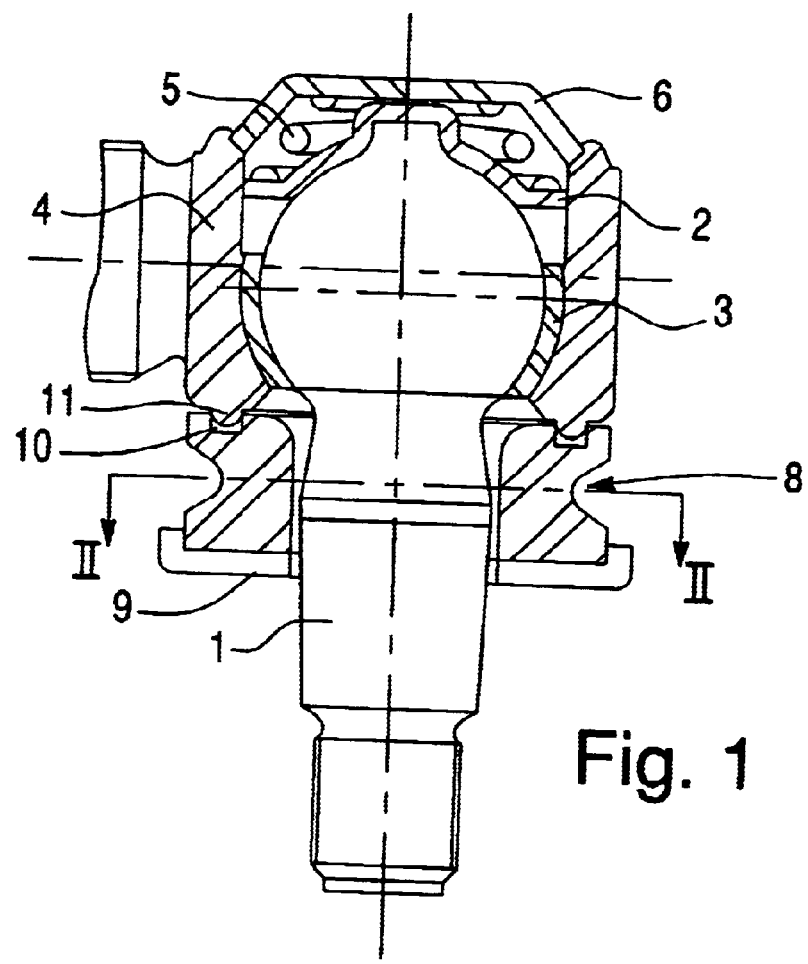
FIG. 1 shows the ball joint in partial longitudinal cross section, for visualization of its construction details.
Figure 2:
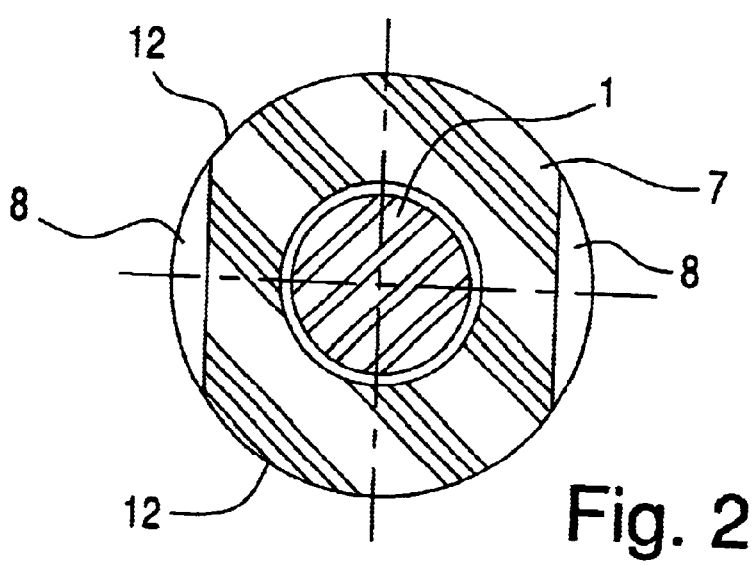
FIG. 2 shows in plan view the "x—x" cross-section of the ball joint.

As it is seen in FIG. 1, the ball joint is constituted of a ball pin 1 that is housed in an upper bearing 2 and in a lower bearing 3, and the assembly is mounted in the inside of a box 4, in whose opening, through where the assembly was introduced, is placed a spring 5 and afterwards closed by a cover 6. Through the opposite end of the box 4 is projected the body of the ball pin 1 that is fixed in a piece, and the external part of the box 4 that is fixed in another piece, so that the restricted angular and free rotational movements produced by the ball pin 1 relative to the box 4 is transmitted to these pieces providing the movement requirements demanded by the same.

About the body of the ball pin 1 there is provided the bushing 7 providing the object of this invention. The bushing 7 is made of elastomer in the cylindrical form, whereby in the middle area of its external circumference, two opposite recesses 8 are provided that flex themselves when the ball pin 1 is angularly displaced toward this direction. Namely, these recesses 8 cause a relief in the elastomer when the same is solicited in this direction, causing an "accordion" effect, such as is the movement and effect of a protection cover regularly utilized for the sealing of ball joints. In the lower face of the bushing 7 is provided an involving washer 9 that has as function to avoid the deformation of the bushing 7 when mounted and in operation, and, in the upper part, the bushing 7 seals the oblong opening of the box 4 through which is projected the body of the ball pin 1. In this face, the bushing 7 has a positioning hole 10 that may be constructed in varying forms and that receives a projection 11 provided in the wall of the oblong opening of the box 4 that may also be constructed in varying forms. The hole 10 and the projection 11 have the important function of positioning the bushing 7 during the process of mounting of the ball joint, with its smooth external circumference 12, where are not provided the recesses 8 coincident, namely, in the same direction of the oblong opening of the box 4, through where is projected the body of the ball pin 1. An important technical effect is derived from this system, as, being coincident, the smooth surface 12 of the external circumference of the bushing 7 with the oblong opening of the box 4, through where is projected the body of the ball pin 1, the angular movement of the ball pin 1, relative to the box 4, of the ball joint, will have the required restriction, in the narrowest sense of the oblong opening of the box 4 to force the ball pin 1 to remain in its projected geometrical axle and maintain the connecting rod perfectly aligned to the other components of the system. The restricting effect of the angular movement of the ball pin 1, relative to the box 4, of the ball joint, in the desired direction, is obtained, therefore, with all efficiency arisen of the very construction system of the bushing 7 and of its mounting in the ball joint, as, the smooth surface 12 of the external circumference of the bushing 4, namely, the quadrant opposite to the recesses 8 exert the function of a spring when the angular movement of the ball pin 1 is exerted in this direction. With this construction, the bushing 7 that restricts the angular movement of the ball joint as the restricting function proper when exerts the spring function through the smooth surface 12 of its external circumference, accumulates the sealing function exerted by the protection covers usually utilized in the ball joints, when it exerts the function of an accordion, through the recesses 8 provided also in its external circumference and, having in view the cooperation existent between these two functions, the bushing 7 does not have to support excessive strains, what provides a great durability to it.

While the foregoing invention has been shown and described with reference to a preferred embodiment, it will be understood by those of skill in the art that various changes in form and detail may be made therein without departing from the spirit and scope of the present invention.

What is claimed is:

1. Bushing that restricts angular movement, for ball joint, comprising:

a ball pin member that is housed in an upper bearing and in a lower bearing, said upper and lower bearings being mounted in the interior of a box that receives a spring and is closed by a cover member, wherein a pin portion of the ball pin member is projected through an oblong opening of the box, opposite to the closing cover member, thereby providing an angular movement restricted in predetermined direction, and a free rotational movement with respect to movement generated between the ball pin member and the box, wherein the pin portion of the ball pin member that projects through the oblong opening of the ball joint, is mounted with a bushing of elastomeric construction, said bushing being formed with at least two discrete recessed grooves in two opposite quadrants of an external circumferential surface and smooth surfaces separating the two opposite quadrants along said external circumferential surface.

2. Bushing that restricts angular movement, for ball joint, according to claim 1, further comprising a positioning hole that positions said bushing during the process of mounting of the ball joint, with respect to the smooth surfaces of said external circumferential surface coincident with the oblong opening of the box, said positioning hole receiving a projection provided on the box.

3. Bushing that restricts angular movement, for ball joint, according to claim 1, wherein said bushing provides a required restriction of movement in a predetermined direction defined by said recessed grooves and smooth surfaces.

4. Bushing that restricts angular movement, for ball joint, according to claim 1, further comprising an involving washer overlapped on lower surface of said bushing opposite said box, said washer prevents deformation of the bushing when mounted and in operation.

5. Bushing that restricts angular movement, for ball joint, according to claim 1, wherein said recessed grooves allow improved sealing of the ball joint and, through the smooth surfaces the bushing provides a spring effect that will maintain the ball pin member in its designed geometrical axle.

* * * * *